United States Patent
Davie et al.

(10) Patent No.: US 8,228,822 B2
(45) Date of Patent: Jul. 24, 2012

(54) HIERARCHICAL FLOODING AMONG PEERING OVERLAY NETWORKS

(75) Inventors: Bruce Stuart Davie, Cambridge, MA (US); Jining Tian, Cupertino, CA (US); Jan Medved, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 136 days.

(21) Appl. No.: 12/396,721

(22) Filed: Mar. 3, 2009

(65) Prior Publication Data
US 2010/0226374 A1 Sep. 9, 2010

(51) Int. Cl.
*H04L 12/28* (2006.01)
(52) U.S. Cl. .............................. 370/255; 370/401
(58) Field of Classification Search .................. None
See application file for complete search history.

(56) References Cited

U.S. PATENT DOCUMENTS

| | | | |
|---|---|---|---|
| 2004/0064693 A1* | 4/2004 | Pabla et al. | 713/168 |
| 2004/0085329 A1 | 5/2004 | Xu et al. | |
| 2004/0088646 A1 | 5/2004 | Yeager et al. | |
| 2004/0249970 A1 | 12/2004 | Castro et al. | |
| 2005/0004916 A1 | 1/2005 | Miller et al. | |
| 2006/0168304 A1* | 7/2006 | Bauer et al. | 709/232 |
| 2006/0239275 A1* | 10/2006 | Zlateff et al. | 370/400 |
| 2007/0011267 A1 | 1/2007 | Overton et al. | |
| 2007/0230482 A1 | 10/2007 | Shim et al. | |
| 2007/0237152 A1 | 10/2007 | Zhu | |
| 2008/0008178 A1 | 1/2008 | Tychon et al. | |
| 2008/0016240 A1 | 1/2008 | Balandin | |
| 2008/0181219 A1* | 7/2008 | Chen et al. | 370/389 |
| 2008/0225852 A1 | 9/2008 | Rasnuk et al. | |
| 2009/0083390 A1 | 3/2009 | Abu-Ghazaleh et al. | |
| 2009/0092124 A1* | 4/2009 | Singhal et al. | 370/351 |
| 2009/0234917 A1 | 9/2009 | Despotovic et al. | |
| 2010/0064008 A1 | 3/2010 | Yan et al. | |
| 2010/0162035 A1* | 6/2010 | Rancurel et al. | 714/4 |
| 2010/0172270 A1* | 7/2010 | Smith et al. | 370/255 |
| 2010/0293223 A1 | 11/2010 | Bhardwaj | |
| 2010/0293295 A1 | 11/2010 | Tian et al. | |

FOREIGN PATENT DOCUMENTS

| | | |
|---|---|---|
| CN | 102037711 A | 4/2011 |
| CN | 102037712 A | 4/2011 |
| DE | 10 2006 021591 B3 | 4/2007 |
| EP | 2 034 665 A1 | 3/2009 |

(Continued)

OTHER PUBLICATIONS

Hari Balakrishnan, Scott Shenker, and Michael Walfish, "Peering Peer-to-Peer Providers", http://nms.csail.mit.edu/papers/pppp-iptps05.pdf.

(Continued)

*Primary Examiner* — Hassan Phillips
*Assistant Examiner* — Eunsook Choi
(74) *Attorney, Agent, or Firm* — Patent Capital Group

(57) ABSTRACT

In a tiered system of networks capable of processing distributed hash table (DHT) Put and Get messages, if a sending network of a Put or Get is at a tier below a subject tier at which a subject network receiving the message is located, the message is forwarded to networks at tiers below the subject tier. On the other hand, if the sending network is at a tier equal to or above the subject tier, the message is forwarded to all networks in the system other than the sending network.

20 Claims, 1 Drawing Sheet

FOREIGN PATENT DOCUMENTS

| WO | WO 2005/079020 A1 | 8/2005 |
|---|---|---|
| WO | WO 2008/110054 A1 | 9/2008 |
| WO | WO 2010/135251 | 11/2010 |
| WO | WO 2010/135254 | 11/2010 |

OTHER PUBLICATIONS

Balakrishnan et al., "Peering Peer-to-Peer Providers," IPTPS, Feb. 2005, pages; http://nms.lcs.mit.edu/papers/pppp-iptps05.pdf.

Juwei Shi et al., "A Hierarchical Peer-to-Peer SIP System for Heterogeneous Overlays Interworking," Global Telecommunications Conference 2007; GLOBECOM '07 IEEE, Piscataway, NJ, USA, Nov. 1, 2007, XP031195953 ISBN: 978-1-4244-1042-2, pp. 93-97.

PCT Notification of Transmittal (1 page) of the International Search Report (4 pages) and Written Opinion of the International Searching Authority (4 pages) mailed Aug. 19, 2010 for PCT/US2010/035131.

USPTO Apr. 1, 2011 Non-Final Office Action from U.S. Appl. No. 12/467,849.

PCT Dec. 1, 2011 Notification and Transmittal of International Preliminary Report on Patentability from PCT/US2010/035126; 7 pages.

PCT Dec. 1, 2011 Notification and Transmittal of International Preliminary Report on Patentability from PCT/US2010/035131; 6 pages.

Ganesan, Prasanna et al., "Yappers: a peer-to-peer lookup service over arbitrary topology," Proceedings IEEE Infocom 2003, The Conference on Computer Communications, 22nd Annual Joint Conference of the IEEE Computer and Communications Societies, San Francisco, CA, Mar. 30-Apr. 3, 2003; Proceedings IEEE InfoCom, The Conference on Compu, vol. Conf. 22, Mar. 30, 2003, pp. 1250-1260, XP002310321.

PCT Notification of Transmittal (1 page) of the International Search Report (4 pages) and the Written Opinion of the International Searching Authority, or the Declaration (5 pages) mailed Aug. 17, 2010 for PCT/US2010/035126.

Stoica, Ian et al., "Chord: A Scalable Peer-to-Peer Lookup Service for Internet Applications," MIT Laboratory for Computer Science, SIGCOMM'01, Aug. 23-31, 2001, San Diego, CA http://pdos.ics.mit.edu/chord/.

USPTO Nov. 10, 2011 RCE Response to Final Rejection from U.S. Appl. No. 12/467,737.

USPTO Nov. 16, 2011 RCE Response to Aug. 16, 2011 Final Office Action from U.S. Appl. No. 12/467,849.

USPTO Mar. 31, 2011 Nonfinal Rejection from U.S. Appl. No. 12/467,737 filed May 18, 2009.

USPTO Jun. 30, 2011 Response to Mar. 31, 2011 Nonfinal Office Action from U.S. Appl. No. 12/467,737.

USPTO Jul. 1, 2011 Response to Apr. 1, 2011 Nonfinal Office Action from U.S. Appl. No. 12/467,849.

USPTO Aug. 10, 2011 Final Rejection from U.S. Appl. No. 12/467,737.

USPTO Aug. 16, 2011 Final Office Action from U.S. Appl. No. 12/467,849.

* cited by examiner

Example network

HIERARCHICAL FLOODING AMONG PEERING OVERLAY NETWORKS

FIELD OF THE INVENTION

The present invention relates generally to hierarchical flooding particularly but not exclusively of PUT and GET messages in overlay networks such as but not limited to peer-to-peer networks.

BACKGROUND OF THE INVENTION

A peer-to-peer network is an example of a network (of a limited number of peer devices) that is overlaid on another network, in this case, the Internet. In such networks it is often the case that a piece of content or a service desired by one of the peers can be provided by more than one other node in the overlay network, and it is desirable to select the source node to optimize efficiency.

Distributed hash tables (DHTs) are a class of decentralized distributed systems that provide a lookup service similar to a hash table: (name, value) pairs are stored in the DHT, and any participating node can efficiently retrieve the value associated with a given name. Responsibility for maintaining the mapping from names to values is distributed among the nodes, in such a way that a change in the set of participants causes a minimal amount of disruption. This advantageously allows DHTs to scale to extremely large numbers of nodes and to handle continual node arrivals, departures, and failures. DHTs form an infrastructure that can be used to build more complex services, such as distributed file systems, peer-to-peer file sharing and content distribution systems, cooperative web caching, multicast, anycast, domain name services, and instant messaging.

BRIEF DESCRIPTION OF THE DRAWINGS

The details of the present invention, both as to its structure and operation, can best be understood in reference to the accompanying drawings, in which like reference numerals refer to like parts, and in which.

DESCRIPTION OF EXAMPLE EMBODIMENTS

Overview

Figure 1:
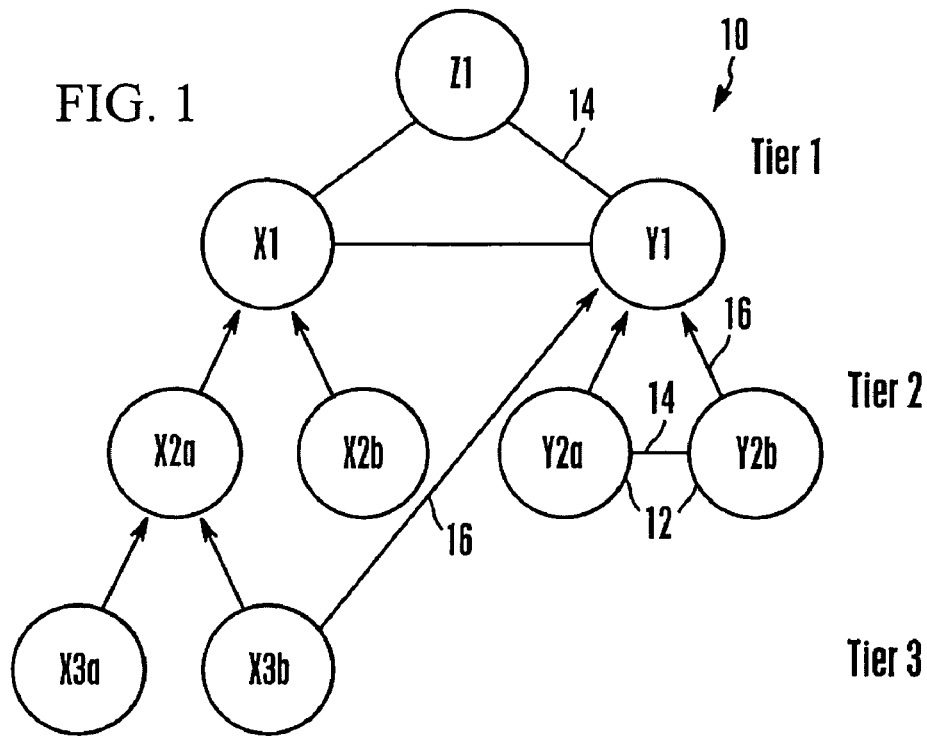
FIG. 1 is a block diagram of an example system in accordance with present principles.

As understood herein, peering among DHTs can be achieved by broadcasting Put and Get messages (respectively, messages seeking to place data and messages seeking to obtain data) among the peered DHTs. If all DHTs are directly connected to all other DHTs then broadcasting is straightforward, but as understood herein, if the relationship between peering DHTs is more topologically complex so that some DHTs do not connect directly to other DHTs, then flooding Put and Get messages is potentially expensive, and requires a loop prevention mechanism.

Techniques for flooding of messages are known in link-state routing protocols, but as understood herein important differences exist between link-state routing and DHT peering. First, the overhead of flooding Puts and Gets, which are expected to be broadcast frequently, is of greater concern in DHT peering than are the relatively infrequent updates performed by routing protocols. Second, message passing among networks as envisioned herein differs from route advertisement because the gateways do not retain state about previously seen messages, rendering transferring flooding solutions from the route advertisement problem to the problem of passing messages between networks problematic.

Present principles are directed to alleviate one or more of the above drawbacks.

Accordingly, an apparatus has a processor and a computer readable storage medium bearing instructions to cause the processor to receive, at a subject network in a system of networks, a distributed hash table (DHT) data transfer message from a sending network. The instructions also cause the processor to forward the message on to all other networks in the system except the customer network if the sending network is a customer network of the subject network. On the other hand, if the sending network is a peer network to the subject network or a provider network to the subject network, the processor forwards the message to only networks in the system that are customer networks of the subject network.

The data transfer message can be a DHT Put or Get message. The processor may be embodied in a gateway. If desired, the data transfer message may include information regarding data transfer policy.

In another embodiment a tangible computer readable medium bears instructions executable by a computer processor in a subject network for determining whether a DHT Put or Get message is received from a customer network of the subject network. Based on the determining act, the processor selectively sends the message only to other customer networks of the subject network.

In another embodiment a computer-implemented method includes receiving, at a subject network, from a sending network in a multi-tiered system of networks, a distributed hash table (DHT) data transfer message. If the sending network is at a tier below a subject tier at which the subject network is, the message is forwarded to all networks in the system other than the sending network. In contrast, if the sending network is at a tier equal to or above the subject tier, the message is forwarded only to networks in the system at a lower tier than the sending network.

EXAMPLE EMBODIMENTS

The following acronyms and definitions are used herein:

Autonomous DHT (AD): a DHT operated independently of other DHTs, with the nodes in the AD serving the entire DHT-ID keyspace.

Peering Gateway: a designated node in a DHT which has Internet Protocol (IP) connectivity to one or more Peering Gateways in other ADs and which forwards Puts, Gets, and the responses to Gets between the local DHT and the peer(s).

Origin DHT: The DHT in which a piece of content is originally stored, which will be the authoritative source for the content.

Present principles apply to one or more usage scenarios. For example, in one scenario multiple Autonomous Systems are provided within a single provider. More specifically, for operational reasons, a single service provider may choose to operate a network as a set of autonomous systems (AS). Each AS may be run by a different organization. These AS do not necessarily have to be true AS in the routing sense. For example, an AS may be an "Autonomous DHT" (AD). An Autonomous DHT is a group of nodes that form their own independent DHT ring and operate largely independently of other ADs. Each AD has access to the complete DHT-ID space, but may or may not store content that is stored in other ADs. It is desirable in this case that content located in one AD can be selectively accessed from another. There are many variants of this scenario, such as a provider having one AD that hosts the provider's content and a number of ADs that serve different regions or different classes of customer (such as mobile, DSL, etc).

Another usage scenario is peering among providers, in which service providers who operate DHTs may wish to peer with each other. This scenario differs from the preceding case mainly in the fact that a high degree of co-operation or trust among competing providers cannot be assumed. Thus, this scenario requires an appropriate level of isolation and policy control between providers. Variants of this scenario include providers whose main function is to host content, who then peer with providers whose main function is to connect customers to the content. Other variants may include providers who provide connectivity between small providers and "backbone" providers.

In both of the above usage scenarios the graph of providers should not be assumed to have any particular structure.

Accordingly and turning now to FIG. 1, a system 10 of networks 12 is organized into a hierarchy that may be expected to develop among peering content providers. Understanding that a strict hierarchy with only a single root, with every network being the child of at most one parent network, should not be assumed because such an assumption is too restrictive as a practical matter, a number of Tier 1 networks are postulated that peer with each other; below the Tier 1 networks are Tier 2 networks, who obtain service from one or more Tier 1 networks, and below that are Tier 3 networks, etc.

Each network in FIG. 1 may be a DHT or other DHT-like entity that supports the Put/Get interface of a DHT even though it may be implemented in some other way internally. In one example embodiment each network can serve puts and gets of any key in the full DHT keyspace.

In FIG. 1, tier 1 networks include networks labeled X1, Y1, and Z1, and communicate with each other over peer to peer links 14, shown without arrows. Tier 2 networks are labeled X2a, X2b, Y2a, and Y2b, and communicate with tier 1 networks over customer-provider links 16, indicated by arrows at their ends to distinguish them from peer to peer links. The tier 2 networks Y2a and Y2b are peers with each other and consequently communicate with each other over a peer to peer link 14 as shown. Thus, links between networks are either customer-provider, or peer to peer, with customer-provider links connecting a higher tier network to a lower tier and with peer to peer links connecting networks at the same tier.

Furthermore, FIG. 1 shows that tier 3 networks labeled X3a and X3b communicate with tier 2 networks over customer-provider links 16. In the case of the tier 3 network X3b, it communicates with two networks, one in the second tier (X2a) and one in the first tier (Y1). In general, the relationship among networks are established by the operators of the networks, e.g., whether two networks will be in a peer relationship or whether one network will act as a provider with another, customer network.

Figure 2:
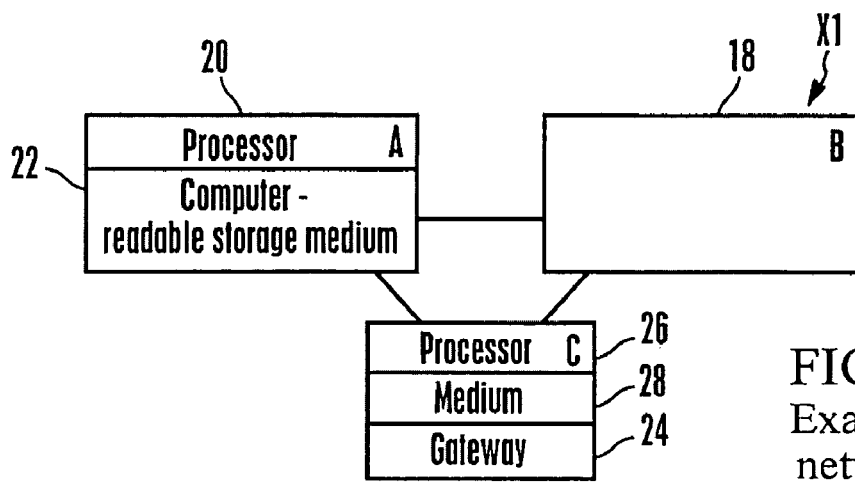
FIG. 2 is a block diagram of a simplified network of the system shown in FIG. 1.

FIG. 2 shows a simplified view of a network, in this case, the network X1 from FIG. 1. As shown, a network may include plural members 18, each typically with one or more processors 20 accessing one or more computer-readable storage media 22 such as but not limited to solid state storage and disk storage. Typically, a network also includes a respective gateway 24 with its own processor 26 and computer readable storage media 28 that may embody present logic for execution thereof by the processor 26. Other parts of the logic may be implemented by one or more other members 18 of the network. Network members 18 may include, without limitation, end user client devices, Internet servers, routers, switches, etc.

In example embodiments the gateway 24 includes a list of the DHTs with which it has peering relationships to enable a Get operation to be forwarded to the correct gateway to reach the origin DHT. This also allows Puts to be forwarded to appropriate DHTs in the case where a Put is to be published in some peer DHTs and not others.

Figure 3:
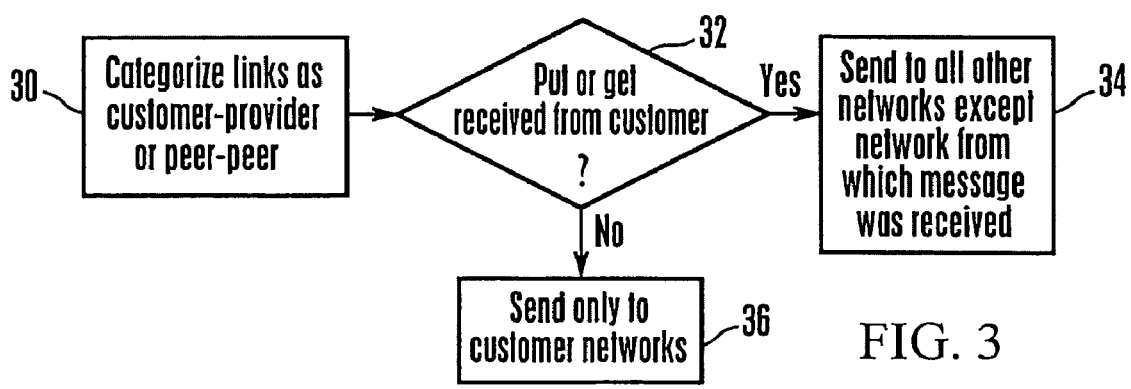
FIG. 3 is a flow chart of example logic for forwarding Put and Get messages.

FIG. 3 illustrates that by categorizing links as described above, the amount of flooding needed to reliably broadcast a Get or Put message to all networks can be reduced using the logic of FIG. 3. More specifically, the links of the system 10 are categorized at block 30 as described above. Then, when, e.g., a gateway of a network receives a put or get message, it determines at decision diamond 32 whether the message is received from a customer of the network. If it is, the logic moves to block 34, wherein the put (or get) is sent to all other networks except the one from which it was received. On the other hand, if a message is received from a peer or from a provider of the receiving network, the receiving network forwards the put or get to only customer networks at block 36.

It may now be appreciated that by applying the above logic, messages flow up towards the Tier 1 networks and then down to the lower tiers. By ensuring that the route of a message is in effect "valley-free"—that is, once a message starts going down the hierarchy, it can't start going back up again—FIG. 3 considerably reduces the replication of messages. Messages may still be received more than once by a single network—for example, network X3b in FIG. 1 could receive the same message from both network X2a and network Y1—but messages cannot loop under FIG. 3 and overall message replication is reduced.

As understood herein, a case may arise in which a link cannot be categorized as either customer-provider or peer to peer, in which case such a link is always used to forward messages no matter where they were received from, and messages will be forwarded to all networks when they are received on such "other" links. In this way, there are no restrictions on the relationships that may exist among providers. Every relationship is either peer to peer, customer-provider, or other.

It is to be understood that the categorization of links into "customer-provider", "peer to peer" and "other" does not necessarily imply anything about economic relationships. It simply implies that messages will be forwarded along these links according to the logic described above.

It is to be further understood that autonomous policies can be used with the above logic on a per-message and/or on per-message-type basis. For example, network X2a in FIG. 1 can implement a policy that forwards Put messages to X1 from X3a and X3b, but not from X1 to X3a and X3b, thus enabling X3a and X3b to act as publishers of content but not consumers. Without limitation, other policies may be implemented. To control policy along the lines described above, service nodes that send Puts and Gets to peering gateways may apply policy tags to the messages. These tags are opaque values as far as the gateways are concerned. The tags may be matched for filtering purposes and may be replaced or added to. A message may carry more than one policy tag. A typical use of a tag can be to mark a Put or Get so that it is only distributed to "customer DHTs" or to ensure that it is delivered to some other specified set of DHTs.

In example implementations, the "put" and "get" messages above make data that is stored in one DHT available to other DHTs. In one implementation broadcast Puts are used, in which a Put in one DHT is forwarded on to all other DHTs and the same data is Put in each DHT. Thus, a Get of the same data in any DHT can be served by the node in the same DHT as the Get. In a second, presently preferred implementation, a broadcast Put is done of a DHT key only, such that a Put in one DHT is forwarded to all DHTs, but only the DHT-ID (key) and a pointer back to the original DHT is stored. A Get in any DHT can locate that pointer and then be forwarded on to the original DHT. In yet another implementation a broadcast Get is contemplated in which a Put in one DHT is stored only in that DHT. A get in any other DHT for that key must be broadcast to all DHTs; it will succeed in the original DHT.

If desired, each time a put occurs the particular option to use for that key could be specified as an additional parameter. Similarly a Get operation may be augmented with additional parameters to specify whether it should be forwarded or broadcast outside the local DHT.

DHT modes of operating, in simple -terms, include putting and getting-opaque data.

Below are example non-limiting examples of put ad get message processing.

Put Example:
A typical Put interface to a single DHT consists of a key and a value to be stored at the location identified by the key. In the presently preferred non-limiting embodiment the Put interface can be modified to additionally include some amount of policy information. For instance, a Put can specify whether this (key, value) pair is to be exported to other AS or kept local to the current AS. More detail can be provided, such as a specific set of AS to which the data should be exported.

In addition to the above, a Put message may include an ordered list of the Autonomous DHTs (ADs) which the PUT has already visited. The Put can also include a hop count initialized to some value when the PUT is first generated (according to local policy of the initiator) and decremented by each gateway that receives the PUT. If the hop count reaches zero the PUT is not forwarded any further.

Additionally, an explicit route listing the DHTs to visit, in order can be included in a Put, as can be a timeout value indicating the period the sender of the Put desires the descriptor to be stored before being timed out. If desired, a Put can include a pointer back to the "previous hop" DHT.

Get Example:
A Get in the origin DHT can be a conventional DHT Get operation. In addition, a Get message may also include an ordered list of the Autonomous DHTs (ADs) which the GET has already visited, a hop count, and an explicit route that mirror these parameters as discussed above in relation to a Put.

Understanding that it may be desirable for a Put or Get message sent within a DHT to be identified as local or remote, e.g., to signal to a root node whether it should or should not issue a Get to a gateway for content that it currently does not have, a simple binary flag or policy tag may be appended to Put or Get messages. As also mentioned above, to enable directed gets to be routed correctly, a DHT Path can be stored with a descriptor, and this object may be provided by a gateway when it issues a Put to a root node, and thus must be carried in a Put message. Further, if an inter-DHT message requests a non-default timeout when Putting a descriptor, that information may also be conveyed to the DHT root node.

While the particular HIERARCHICAL FLOODING AMONG PEERING OVERLAY NETWORKS is herein shown and described in detail, it is to be understood that the subject matter which is encompassed by the present invention is limited only by the claims.

What is claimed is:

1. An apparatus comprising:
a processor in a subject network in a system of networks;
computer readable storage medium bearing instructions to cause the apparatus to:
receive a distributed hash table (DHT) data transfer message from a sending network, wherein if the data transfer message should be forwarded outside a local DHT, at least one tag in the data transfer message specifies a designated delivery to a specific set of DHTs, and wherein a particular data transfer message is provided with a DHT key and a pointer back to an original DHT associated with the DHT key, and wherein the DHT key is stored by a receiving node;
if the sending network is a customer network of the subject network, forward the message on to other networks in the system except the customer network;
if the sending network is a peer network to the subject network or a provider network to the subject network, forward the message to networks in the system that are customer networks of the subject network.

2. The apparatus of claim 1, wherein the data transfer message is a DHT Put message.

3. The apparatus of claim 1, wherein the data transfer message is a DHT Get message.

4. The apparatus of claim 1, wherein the processor is embodied in a gateway.

5. The apparatus of claim 1, wherein the data transfer message includes information regarding data transfer policy.

6. The apparatus of claim 1, wherein the data transfer message makes data that is stored in one DHT available to other DHTs.

7. A tangible non-transitory computer readable medium bearing instructions executable by a computer processor in a subject network for:
determining whether a distributed hash table (DHT) Put or Get message is received from a customer network of the subject network, wherein the DHT Put or Get message contains data indicating if the DHT Put or Get message should be forwarded outside a local DHT; and
based on the determining act, selectively sending the message to other customer networks of the subject network, wherein service nodes that communicate put and get messages apply policy tags to the messages that are opaque to gateways in the subject network, and wherein if the DHT Put or Get message should be forwarded outside the local DHT, at least one of the tags specifies a designated delivery to a specific set of DHTs, and wherein a particular broadcast Put message is provided with a DHT key and a pointer back to an original DHT associated with the DHT key, and wherein the DHT key is stored by a particular receiving node.

8. The medium of claim 7, wherein if the Put or Get message is received from a customer network, the message is sent to networks in a system other than the customer network from which the message is received.

9. The medium of claim 7, wherein the subject network is in a system of networks, and if the Put or Get message is received from a sending network that is not a customer network, the message is sent to customer networks of the subject network.

10. The medium of claim 7, wherein the processor is embodied in a gateway.

11. The medium of claim 7, wherein the message includes information regarding data transfer policy.

12. The medium of claim 7, wherein the message makes data that is stored in one DHT available to other DHTs.

13. The medium of claim 7, wherein the message includes information representing an explicit data transfer route.

14. A computer-implemented method comprising:
receiving, at a component in a subject network, from a sending network in a multi-tiered system of networks, a distributed hash table (DHT) data transfer message, wherein if the data transfer message should be forwarded outside a local DHT, at least one tag in the data transfer message specifies a designated delivery to a specific set of DHTs, and wherein a particular data transfer message is provided with a DHT key and a pointer back to an original DHT associated with the DHT key, and wherein the DHT key is stored by a receiving node;
if the sending network is at a tier below a subject tier at which the subject network is, forwarding the message to networks in the system other than the sending network;
if the sending network is at a tier equal to the subject tier, forwarding the message to networks in the system at a lower tier than the sending network; and
if the sending network is at a tier above the subject tier, forwarding the message to networks in the system at a lower tier than the sending network, wherein service nodes that communicate put and get messages apply policy tags to the messages that are opaque to gateways in the subject network.

15. The method of claim 14, wherein the data transfer message is a DHT Put message.

16. The method of claim 14, wherein the data transfer message is a DHT Get message.

17. The method of claim 14, wherein the method is executed by a gateway.

18. The method of claim 14, wherein the data transfer message includes information regarding data transfer policy.

19. The method of claim 14, wherein the data transfer message is useful in transferring data stored in one DHT to at least one other DHT.

20. The method of claim 14, wherein the message includes information representing an explicit data transfer route.

* * * * *